(12) United States Patent
Okada et al.

(10) Patent No.: US 12,411,504 B2
(45) Date of Patent: Sep. 9, 2025

(54) PIEZO POSITION CONTROL FLOW RATIO CONTROL

(71) Applicant: Applied Materials, Inc., Santa Clara, CA (US)

(72) Inventors: Ashley Okada, San Jose, CA (US); Ming Xu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/496,355

(22) Filed: Oct. 27, 2023

(65) Prior Publication Data

US 2024/0053777 A1 Feb. 15, 2024

Related U.S. Application Data

(62) Division of application No. 17/496,654, filed on Oct. 7, 2021, now Pat. No. 11,841,715.

(60) Provisional application No. 63/104,290, filed on Oct. 22, 2020.

(51) Int. Cl.
*G05D 11/13* (2006.01)
*G05B 17/02* (2006.01)
*G05D 7/06* (2006.01)

(52) U.S. Cl.
CPC ............ *G05D 11/13* (2013.01); *G05B 17/02* (2013.01); *G05D 7/0635* (2013.01)

(58) Field of Classification Search
CPC .... G05D 11/13; G05D 7/0635; G05D 11/132; G05B 17/02
See application file for complete search history.

(56) References Cited

U.S. PATENT DOCUMENTS

| 6,418,954 | B1 | 7/2002 | Taylor et al. |
| 2003/0130807 | A1 | 7/2003 | Ambrosina et al. |
| 2005/0211312 | A1 | 9/2005 | Pfaff et al. |
| 2006/0097644 | A1 | 5/2006 | Kono et al. |
| 2009/0319071 | A1 | 12/2009 | Yun et al. |
| 2011/0100489 | A1 | 5/2011 | Orito et al. |

(Continued)

FOREIGN PATENT DOCUMENTS

KR 101963856 B1 7/2019

OTHER PUBLICATIONS

International Search Report and Written Opinion for International Application No. PCT/US2021/056101, mailed Feb. 8, 2022, 9 Pages.

*Primary Examiner* — Chad G Erdman
(74) *Attorney, Agent, or Firm* — Lowenstein Sandler LLP

(57) ABSTRACT

A flow ratio controller (FRC) valve includes a displacement device configured to control fluid flow through the FRC valve, a displacement sensor coupled to the displacement device, and a processing device. The processing device is to: identify an input signal indicative of a first setpoint to preposition the displacement device for a process of a recipe; commence, based on the input signal, adjustment of physical displacement of the displacement device; determine, based on a feedback signal received from the displacement sensor during the adjustment, whether the physical displacement of the displacement device matches the first setpoint; and responsive to determining that the physical displacement of the displacement device matches the first setpoint, stop the adjustment of the physical displacement of the displacement device.

20 Claims, 5 Drawing Sheets

(56) References Cited

U.S. PATENT DOCUMENTS

| | | |
|---|---|---|
| 2011/0265951 A1 | 11/2011 | Xu et al. |
| 2013/0037112 A1* | 2/2013 | Smirnov .............. G05D 7/0635 137/1 |
| 2013/0085618 A1 | 4/2013 | Ding |
| 2014/0209177 A1 | 7/2014 | Bauer et al. |
| 2014/0222313 A1* | 8/2014 | Keller ....................... F01L 1/18 123/90.11 |
| 2017/0200599 A1 | 7/2017 | Takasawa et al. |
| 2017/0328756 A1 | 11/2017 | Chamberlain et al. |
| 2020/0348704 A1* | 11/2020 | Sugita .................. G05D 7/0647 |
| 2022/0037167 A1 | 2/2022 | Yabuta et al. |
| 2022/0108875 A1 | 4/2022 | Thie et al. |

\* cited by examiner

PIEZO POSITION CONTROL FLOW RATIO CONTROL

RELATED APPLICATIONS

This application is a divisional of U.S. Non-Provisional application Ser. No. 17/496,654, filed Oct. 7, 2021 which claims the benefit of Provisional Application No. 63/104,290, filed Oct. 22, 2020, the contents of which are hereby incorporated by reference in its entirety.

TECHNICAL FIELD

The present disclosure relates to flow ratio control, and, more particularly, flow ratio control using piezo position control.

BACKGROUND

Products are produced by performing one or more manufacturing processes using manufacturing equipment. For example, substrate processing equipment is used to produce substrates via substrate manufacturing processes in a substrate processing system. Substrate manufacturing processes include providing fluid flow to one or more chambers of the substrate processing system.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, for a first pipe, a first plurality of pressure values corresponding to a first plurality of valve positions of a first valve coupled to the first pipe. The method further includes receiving, for a second pipe routed in parallel with the first pipe, a second plurality of pressure values corresponding to a second plurality of valve positions of a second valve coupled to the second pipe. The method further includes generating a fluid conductance map based on the first plurality of valve positions, the first plurality of pressure values, the second plurality of valve positions, and the second plurality of pressure values. The method further includes causing, by a processing device based on a recipe and the fluid conductance map, the first valve to be in a first valve position and the second valve to be in a second valve position for a process of the recipe.

In another aspect of the disclosure, a system includes piping including an inlet pipe, a first pipe, and a second pipe, wherein a first distal end of the inlet pipe is coupled to a fluid source, wherein a second distal end of the inlet pipe is coupled to the first pipe and the second pipe that are in parallel. The system further includes a first valve coupled to the first pipe and configured to control a first flow rate through the first pipe. The system further includes a second valve coupled to the second pipe and configured to control a second flow rate through the second pipe. The system further includes a processing device to cause, based on a recipe, the first valve to be in a first valve position and the second valve to be in a second valve position for a process of the recipe.

In another aspect of the disclosure, a flow ratio controller (FRC) valve includes a displacement device configured to control fluid flow through the FRC valve, a displacement sensor coupled to the displacement device, and a processing device. The processing device is to: receive an input signal indicative of a first setpoint to preposition the displacement device for a process of a recipe. The processing device is further to commence, based on the input signal, adjustment of physical displacement of the displacement device. The processing device is further to determine, based on a feedback signal received from the displacement sensor during the adjustment, whether the physical displacement of the displacement device matches the first setpoint. Responsive to determining that the physical displacement of the displacement device matches the first setpoint, the processing device is further to stop the adjustment of the physical displacement of the displacement device.

BRIEF DESCRIPTION OF THE DRAWINGS

The present disclosure is illustrated by way of example, and not by way of limitation in the figures of the accompanying drawings.

DETAILED DESCRIPTION

Figure 1:
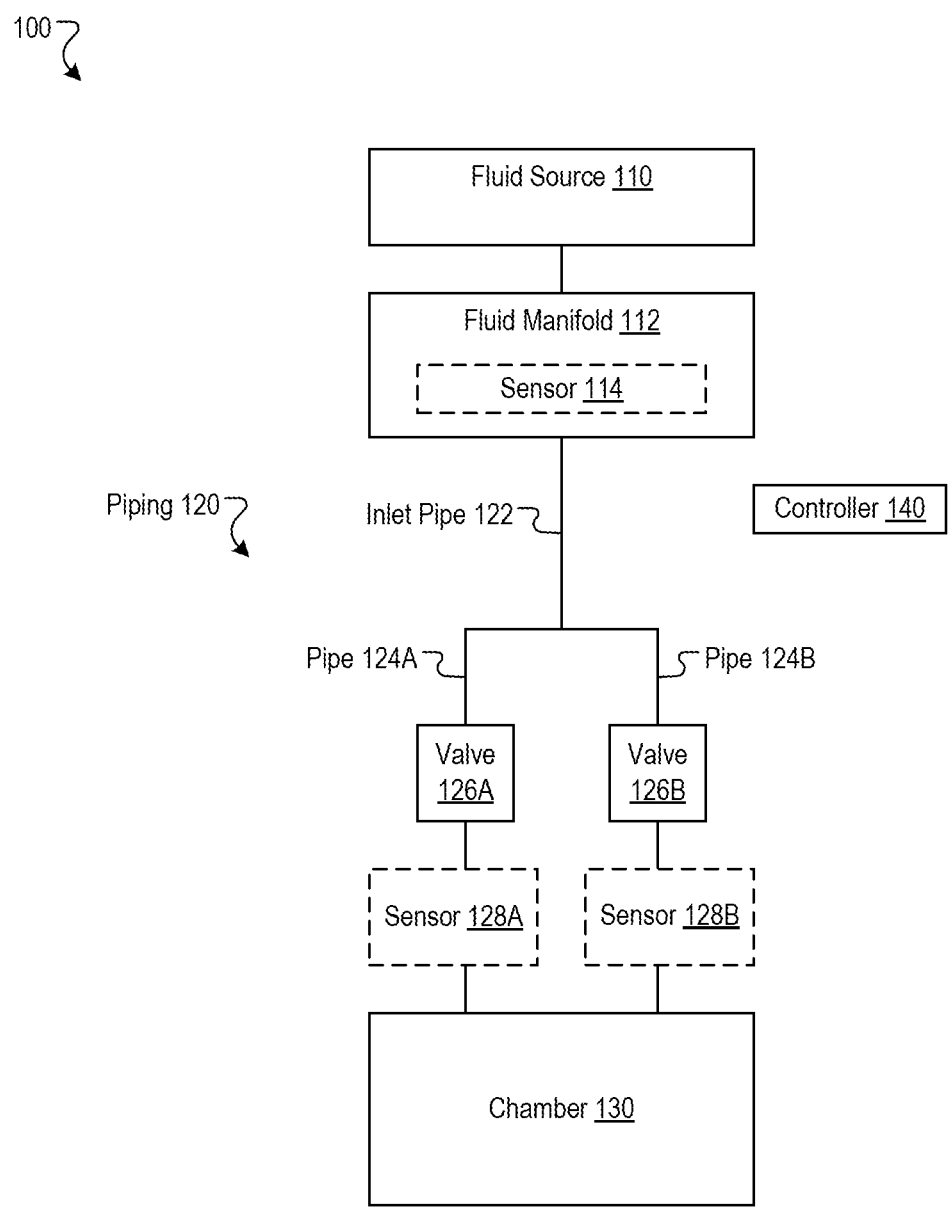
FIG. 1 is a block diagram illustrating a substrate processing system, according to certain embodiments.

Described herein are technologies directed to flow ratio control (e.g., using piezo position control).

Products are produced by performing one or more manufacturing processes. For example, substrates (e.g., wafers, semiconductors, etc.) are produced by performing one or more substrate manufacturing processes. Substrate manufacturing processes include providing fluid flow to one or more chambers of the substrate processing chamber. In some examples, a common fluid source provides fluid to two or more locations, such as two or more chambers (e.g., processing chambers), two or more zones in a chamber (e.g., zones of a showerhead in a processing chamber), or the like. Some recipes include simultaneously providing a first flow rate of fluid to a first location and a second flow rate of fluid to a second location.

Systems use either passive control or active control to divert fluid flow into two or more channels. In passive flow, dimensions of the piping are configured to provide a particular amount of flow to each channel. For example, the dimensions of two pipes are controlled to be equal to provide half of the fluid flow through the first pipe and half of the fluid flow through the second pipe. In some examples, the dimensions of the two pipes are controlled to have equal fluid conductance (e.g., volumetric flow rate divided by pressure drop). Passive control is not able to adjust ratio of fluid flow through the different channels and therefore has limited applications.

In some conventional systems that use active control, fixed orifices coupled with valves are used. Depending on the ratio split for the different channels specified by the recipe, different valves open to direct fluid flow through different orifices to provide the different flow rates. A conventional system with many fixed orifices and corresponding valves is expensive, uses more installation and maintenance time, and takes up more space (e.g., is bulky). Active control using fixed orifices is limited to adjusting ratio of fluid flow based on the fixed orifice sizes and therefore has limited applications.

In some conventional systems that use active control, a sensor is embedded in the wetted flow path of each parallel channel to determine the amount of fluid flow through the channel and the fluid flow is actively diverted to the different parallel channels based on sensor data from the sensors. Some conventional systems use a temperature sensor in the wetted flow path or a pressure sensor (e.g., measure pressure over orifices, laminar flow element) in the wetted flow path. In some examples, the fluid in the flow path is corrosive (e.g., corrosive gas, corrosive recipe) that deteriorates the sensors over time. In some examples, sensors (e.g., temperature sensors) at an elevated temperature (e.g., 90 degrees Celsius) deteriorate faster (e.g., elevated temperature further enhances the reaction). In some examples, the sensor values from the sensors in the wetted flow path are biased (e.g., incorrect) due to one or more of drift over time, flow shift, corrosion, material deposition on sensors, mismatch in flow path fluid conductance, and/or the like. The sensors in the wetted flow path are to be corrected, re-calibrated, and replaced over time.

Conventional active control using sensors in the wetted flow path is reactive so that flow ratios are only controlled after fluid flow has been occurring in the pipes where the sensors are located. Conventional active control that is reactive has a valve response time (e.g., to control the valve after the fluid flow is already flowing through the valve) that cause hysteresis of the flow rates (e.g., flow rates lag behind control signals). Conventional active control that is reactive has low reproducibility (e.g., valves take longer or shorter amount of times to achieve valve positions). Hysteresis and low reproducibility contributes to ratio error (e.g., incorrect ratios of flow rates) and substrate critical dimension (CD) shift (e.g., errors in substrates).

The devices, systems, and methods disclosed herein provide flow ratio control (e.g., using piezo position control).

The present disclosure includes generation of a fluid conductance map for flow ratio control. A first pipe and a second pipe are routed in parallel (e.g., the input pipe splits into the first pipe and the second pipe). A processing device receives, for the first pipe, first pressure values corresponding to first valve positions of a first valve coupled to the first pipe. The processing device further receives, for the second pipe, second pressure values corresponding to second valve positions of a second valve coupled to the second pipe. The processing device generates a fluid conductance map based on the first valve positions, the first pressure values, the second valve positions, and the second pressure values. The processing device causes, based on a recipe and the fluid conductance map, the first valve to be in a first valve position and the second valve to be in a second valve position for a process of the recipe. In some examples, if the first valve is to be at 60% flow rate and the second valve is to be at 40% flow rate for an upcoming process of a recipe, the processing device can cause the first valve to be at a 60% position and the second valve to be at a 40% position in anticipation of the process (e.g., being proactive instead of being reactive, increasing throughput). In some examples, the processing device is to open the first valve and the second valve to 100% to clear the first pipe and second pipe in anticipation of an upcoming process of a recipe (e.g., speeding up the clearing of the pipes for the upcoming process, increasing throughput).

The present disclosure includes a system for flow ratio control. The system includes an inlet pipe, a first pipe, and a second pipe, wherein a first distal end of the inlet pipe is coupled to a fluid source, wherein a second distal end of the inlet pipe is coupled to the first pipe and the second pipe that are in parallel. The system further includes a first valve coupled to the first pipe and configured to control a first flow rate through the first pipe. The system further includes a second valve coupled to the second pipe and configured to control a second flow rate through the second pipe. The system further includes a processing device (e.g., of a controller of the substrate processing system) to cause, based on a recipe, the first valve to be in a first valve position and the second valve to be in a second valve position for a process of the recipe.

The present disclosure includes flow ratio controller (FRC) valves for flow ratio control. A FRC valve includes a displacement device (e.g., piezoelectric material, a solenoid, etc.) to control fluid flow through the FRC valve, a displacement sensor (e.g., strain gauge, capacitance sensor, eddy current sensor, etc.) coupled to the displacement device, and a processing device coupled to the displacement device and the displacement sensor. The displacement device, displacement sensor, and processing device are separated from the wetted flow path of the FRC valve by a diaphragm (e.g., valve seating material). The processing device receives an input signal (e.g., voltage value) indicative of a first setpoint (e.g., first fluid flow rate) to preposition the displacement device in anticipation of a process of a recipe. The processing device is further to commence, based on the input signal, adjustment of physical displacement of the displacement device (e.g., increasing or decreasing the size of the opening by moving the diaphragm via the displacement device). The processing device is further to determine, based on a feedback signal received from the displacement sensor during the adjustment, whether the physical displacement of the displacement device matches the first setpoint. Responsive to determining that the physical displacement of the displacement device matches the first setpoint, the processing device is further to stop the adjustment of the physical displacement of the displacement device.

Aspects of the present disclosure result in technological advantages. The sensor of the FRC valve of the present disclosure is outside of the wetted flow path and does not have the biased (e.g., incorrect) sensor values of conventional systems that have sensors in the wetted flow paths. This reduces the time (e.g., calibration, reinstallation, etc.), energy, components (e.g., new sensors), and defective substrates caused by conventional systems that have sensors in the wetted flow path. The system of the present disclosure controls the flow ratios going through different pipes and can be used for more applications than passive control systems and fixed orifice systems. The system of the present disclosure places the valves in a displacement position (e.g., for a fluid flow rate) for a process of a recipe (e.g., being proactive, anticipating the next process) which increases throughput compared to conventional systems.

Although some embodiments of the present disclosure are described in relation to pressure values, in some embodiments, other types of values, such as flow rate values (e.g., volumetric flow rate values, mass flow rate values, etc.), temperature values, and/or the like are used instead of or in addition to pressure values.

FIG. 1 is a block diagram illustrating a substrate processing system 100, according to certain embodiments.

A substrate processing system 100 includes one or more fluid sources 110, sets of piping 120, and chambers 130.

In some embodiments, the chamber 130 includes one or more of an enclosure system (e.g., substrate carrier, front opening unified pod (FOUP), autoteach FOUP, process kit enclosure system, substrate enclosure system, etc.), a side storage pod (SSP), a factory interface (e.g., equipment front end module (EFEM)), a load lock, a transfer chamber, one or more processing chambers, and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber.

The piping 120 is to provide (e.g., route) fluid from the fluid source 110 to one or more chambers 130. In some embodiments, the piping 120 provides (e.g., routes) fluid to two or more chambers 130. In some examples, the piping 120 provides (e.g., routes) fluid to a first processing chamber and a second processing chamber. In some examples, the piping 120 provides (e.g., routes) fluid to a first EFEM and a second EFEM. In some embodiments, the piping 120 provides (e.g., routes) fluid to two or more locations within the same chamber 130. In some examples, the piping 120 provides (e.g., routes) fluid to two or more zones of a showerhead in a processing chamber.

The piping 120 includes an inlet pipe 122 and pipes 124A-B. Pipes 124A-B are in parallel. Pipes 124A-B are considered to be in parallel when they are fluidly connected so that flow from an inlet pipe 122 branches or divides into two or more separate pipes 124A-B. Although two pipes 124A-B are displayed in FIG. 1, inlet pipe can branch into two or more pipes 124 (e.g., each including a corresponding valve 126).

In some embodiments, the substrate processing system 100 includes multiple fluid sources 110. In some embodiments, two or more fluid sources 110 use the same set of piping 120. In some embodiments, each fluid source 110 use its own set of piping 120. In some embodiments, a fluid source 110 provides an inert gas, such as one or more of nitrogen, argon, neon, helium, krypton, or xenon (e.g., to the EFEM, to the FOUP, load lock, SSP, to generate the fluid conductance map, etc.). In some embodiments, a fluid source 110 provides a corrosive gas. In some embodiments, the fluid source 110 provides one or more of atomic chlorine, diatomic chlorine, bromine trifluoride, chlorine trifluoride, nitrogen trifluoride, hydrogen chloride, a sulfur chloride such as sulfur dichloride, xenon dichloride, atomic fluorine, diatomic fluorine, bromine trifluoride, chlorine trifluoride, nitrogen trifluoride, hydrogen fluoride, a sulfur fluoride such as sulfur hexafluoride and xenon difluoride, and/or the like (e.g., to a processing chamber). In some embodiments, one or more fluid sources 110 provide a gas mixture (e.g., a mixture of an inert gas and an oxidation inhibiting gas, such as nitrogen with hydrogen and/or ammonia, provided to an EFEM, FOUP, load lock, SSP, etc.). In some embodiments, the types, ratios, and/or flow rates of fluids provided to one or more chambers 130 are changed over time (e.g., based on the process of the recipe, based on sensors within the chamber 130, etc.).

The substrate processing system 100 includes a controller 140. In some embodiments, the controller 140 includes one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), Personal Computer (PC), mobile phone, smart phone, netbook computer, operator box, etc. In some embodiments, the controller 140 displays a Graphical User Interface (GUI) to receive input and to display output. In some embodiments, the controller 140 receives input (e.g., recipe, sensor data, input data, etc.) (e.g., from data store, client device, metrology equipment, sensors, etc.), processes the input to generate output, and provides the output (e.g., voltage values, fluid conductance map, etc.) (e.g., to data store, client device, components of the substrate processing system 100, valves 126. etc.). In some embodiments, the controller 140 is used to perform method 300A of FIG. 3A.

The controller 140 is coupled to one or more of the fluid manifold 112 (e.g., to control the flow rate and/or the type of fluid entering the inlet pipe 122 of the piping 120), valves 126A-B (e.g., to control the fluid flow rate in the pipes 124A-B), sensor 114 (e.g., to receive sensor data to determine the overall flow rate entering the inlet pipe 122 and/or leaving the fluid manifold 112), sensors 128A-B (e.g., to receive sensor data to generating the fluid conductance map), chambers 130, and/or other portions of the substrate processing system 100 (e.g., robot arms, aligner device, location center finding (LCF) device, other sensors, etc.). In some embodiments, one or more of sensor 114 and/or sensors 128A-B are pressure sensors that provide pressure values. In some embodiments, one or more of sensors 114 and/or sensors 128A-B are used to generate the fluid conductance map and are removed after generating the fluid conductance map (e.g., are not included in the corrosive fluid flow. In some embodiments, one or more of sensors 114 and/or sensors 128A-B are located in different locations (e.g., before valves 126A-B, before fluid manifold 112, in the inlet pipe 122, in the chamber 130, etc.) and/or are combined into less sensors. In some examples, the sensors 128A-B provide inlet pressure values (e.g., are located before valves 126A-B). In some embodiments, sensor 128 is one sensor in the inlet pipe 122.

In some embodiments, the controller 140 is coupled to one or more of the fluid manifold 112, valves 126A-B, sensor 114, sensors 128A-B, chambers 130, and/or other portions of the substrate processing system 100 via a network (e.g., via a wired connection and/or a wireless connection). In some embodiments, the network is a public network that provides controller 140 with access to publically available computing devices. In some embodiments, the network is a private network that provides controller 140 access to privately available computing devices. In some embodiments, the network includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/ or a combination thereof.

In some embodiments, the controller 140 controls the substrate processing system 100 to produce substrates. In some embodiments, the controller 140 causes a corrective action to be performed based on sensor data received from the substrate processing system 100 (e.g., from sensor 114 and/or sensors 128A-B). In some embodiments, a corrective action comprises one or more of providing an alert (e.g., of sensor data drift, of preventative maintenance, of components to be replaced, etc.), updating manufacturing parameters (e.g., flow rate, physical displacement of a valve, opening size of a valve, type of fluids provided, mixture of fluids provided, etc.), interrupting functionality of the substrate processing system 100, and/or the like.

In some embodiments, the controller 140 causes inert gas to be provided from a fluid source 110, through the piping 120, to the chamber 130. The controller 140 transmits voltage values to valve 126A to cause the valve 126A to be in corresponding valve positions (e.g., different physical displacements) during flow of the inert gas through pipe 124A. The controller 140 transmits voltage values to valve 126B to cause valve 126B to be in corresponding valve positions during flow of the inert gas through the pipe 124B. The controller 140 receives, via sensor 128A, sensor values (e.g., pressure values corresponding to fluid flow through pipe 124A) corresponding to valve positions of valve 126A and receives, via sensor 128B, sensor values (e.g., pressure values corresponding to fluid flow through pipe 124B) corresponding to valve positions of valve 126B. The controller 140 generates a fluid conductance map based on the valve positions and sensor values corresponding to valves 126A-B. The controller 140 causes, based on a recipe and the fluid conductance map, valve 126A to be in a first valve position and valve 126B to be in a second valve position for a process of the recipe.

In some embodiments, subsequent to the generation of the fluid conductance map, the sensors 128A-B (e.g., pressure sensors) are removed from pipes 124A-B. In some embodiments, the controller 140 verifies and/or updates the fluid conductance map over time.

In some embodiments, the controller 140 receives a recipe (e.g., for producing substrates via the substrate processing system 100). The controller 140 transmits a first voltage value to valve 126A and a second voltage value to valve 126B to cause the valves 126A-B to be in corresponding valve positions for a process of the recipe. In some embodiments, the controller 140 transmits voltage values to the valves 126A-B to open the valves 126A-B to empty the fluid from the piping 120 in preparation for a process of the recipe (e.g., that uses a different fluid). In some embodiments, the controller 140 transmits voltage values to the valves 126A-B to place the valves 126A-B in corresponding valve positions that will be used in the upcoming process of the recipe.

FIGS. 2A-D are cross-sectional views of FRC valves 200A-D (e.g., valves 126A-B of FIG. 1) for a substrate processing system (e.g., substrate processing system 100 of FIG. 1), according to certain embodiments.

In some embodiments, a FRC valve 200 includes a displacement device 210 configured to control fluid flow through the FRC valve 200, a displacement sensor 220 coupled to the displacement device 210, and a processing device 230 (e.g., circuitry, processing circuitry, processor, etc.) coupled to the displacement device 210 and the displacement sensor 220. In some embodiments, a diaphragm 240 (e.g., valve seating material) separates one or more of the displacement device 210, displacement sensor 220, and/or processing device 230 from the wetted flow path (e.g., the fluid does not contact the displacement device 210, displacement sensor 220, and/or processing device 230). In some embodiments, the FRC valve 200 couples to a pipe 250 (e.g., pipe 124A or pipe 124B of FIG. 1).

Figures 2A, 2B, 2C, 2D:
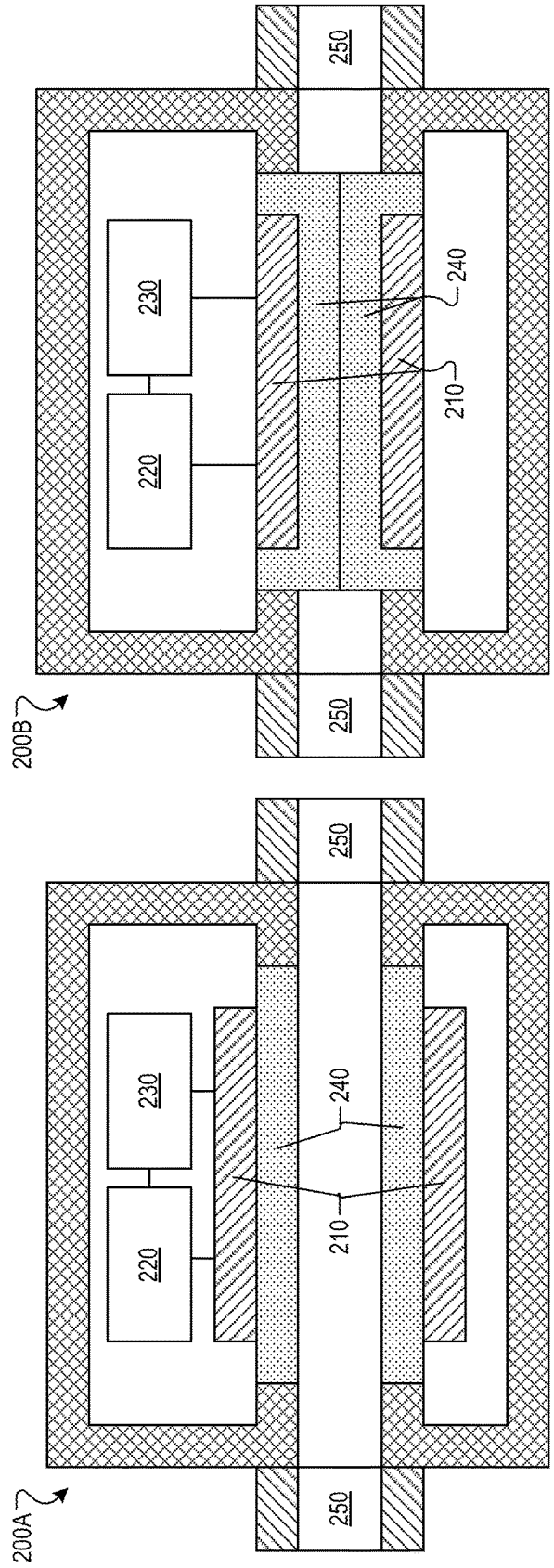
FIGS. 2A-D are cross-sectional views of flow rate control valves for a substrate processing system, according to certain embodiments.

In some embodiments, FRC valves 200A-B are the same FRC valve in different valve positions. In some embodiments, FRC valves 200C-D are the same FRC valve in different valve positions. In some embodiments, FRC valve 200A of FIG. 2A and FRC valve 200C of FIG. 2C are in an open position and FRC valve 200B of FIG. 2B and FRC valve 200D of FIG. 2D are in a closed position.

The displacement device 210 decreases and increases the size of the opening through the FRC valve 200 (e.g., the opening for the wetted fluid flow, the opening aligned with the pipe 250, etc.) from one or more directions. In some embodiments, the displacement device 210 decreases and increases the size of the opening size through the FRC valve 200 from two or more directions (e.g., decreases and increases the entire perimeter, see FIGS. 2A-B). In some embodiments, the displacement device 210 decreases and increases the size of the opening size through the FRC valve 200 in one direction (e.g., see FIGS. 2C-D). In some embodiments, the FRC valve 200 has a single displacement device 210 (e.g., a single displacement device 210 in FIGS. 2C-2D that is displaced from an upper position to a lower position, a single displacement device 210 of FIGS. 2A-B that decreases in inner diameter). In some embodiments, the FRC valve 200 has multiple displacement devices 210 (e.g., an upper displacement device 210 and a lower displacement device 210 of FIGS. 2A-B that are moved to be closer to each other).

In some embodiments, the processing device 230 receives an input signal (e.g., voltage value from controller 140 of FIG. 1) indicative of a first setpoint (e.g., physical displacement of displacement device 210, a first flow rate value, a first flow ratio) to preposition the displacement device 210 for a process of a recipe (e.g., in anticipation of a process of a recipe). The processing device 230 commences, based on the input signal, adjustment of the physical displacement of the displacement device 210. The processing device 230 determines, based on a feedback signal received from the displacement sensor 220 during the adjustment, whether the physical displacement of the displacement device 210 matches the first setpoint. Responsive to determining that the physical displacement of the displacement device 210 matches the first setpoint, the processing device 230 stops the physical displacement of the displacement device 210.

In some embodiments, the displacement device 210 is a piezoelectric material or a solenoid. Responsive to receiving a voltage value, the displacement device 210 (e.g., the piezoelectric material or solenoid) has a physical displacement. In some examples, a first voltage value causes a physical displacement that is open (e.g., full fluid flow through the FRC valve 200) and a second voltage value causes a physical displacement that is closed (e.g., no fluid flow through the FRC valve 200).

In some embodiments, the displacement sensor 220 is a strain gauge, a capacitance sensor (e.g., measures capacitance between two plates), or an eddy current sensor. In some embodiments, the displacement sensor 220 determines a physical displacement of the displacement device 210. The displacement sensor 220 provides feedback of an actual displacement of the displacement device 210. In some embodiments, the processing device 230 receives a voltage value, starts applying the voltage value, and applies a different voltage value (e.g., lower voltage value, higher voltage value) than that received based on the feedback signal (e.g., physical displacement) from the displacement sensor 220. In some embodiments, the displacement device

210 is controllable to a fine resolution (e.g., tens, hundreds, thousands, or tens of thousands of setpoints per full stroke of the valve (e.g., setpoints between open and closed)).

In some embodiments, the processing device 230 determines changes over time. In some examples, the processing device 230 determines a change in amount of time to go from a first valve position to a second valve position (e.g., open to closed, etc.). In some examples, the processing device 230 determines a change correlation between the voltage value and the physical displacement determined by the displacement sensor 220 (e.g., different amounts of voltage to be in an open or a closed position over time). In some embodiments, one or more operations described herein as being performed by processing device 230 are performed by controller (e.g., controller 140 of FIG. 1) of the substrate processing system (e.g., substrate processing system 100). In some embodiments, one or more operations described herein as being performed by controller (e.g., controller 140 of FIG. 1) of the substrate processing system are performed by processing device 230. In some embodiments, the processing devices 230 of two or more valves 200 communicate with each other and/or with one or more other components of the substrate processing system (e.g., substrate processing system 100 of FIG. 1).

In some embodiments, fluid conductance curves are displayed on a flow conductance map (e.g., graph) that includes a first axis of pressure (Torr) and a second axis of valve position (Volts (V)). In some embodiments, a first fluid conductance curve corresponds to a first pipe and a second fluid conductance curve corresponds to a second pipe that is routed parallel to the first pipe (e.g., an inlet pipe splits into at least the first pipe and the second pipe). The first pipe and the second pipe each have a different fluid conductance (e.g., volumetric flow rate divided by pressure drop). In some embodiments, different fluid conductance curves result from one or more of different lengths, different routing, different diameters, different friction, different fittings, different piping geometry, different head loss, different transitions, and/or the like of the first and second pipe.

In some embodiments, the generation of a fluid conductance map is for calibration (e.g., calibrate the voltage provided to valves that provide certain flow rates). The fluid conductance map provides a nonlinear relationship between valve setpoints (e.g., voltage values) and pressure values (e.g., for each pipe of the parallel pipes). In some embodiments, the fluid conductance map includes fluid conductance curves (e.g., a graph).

In some embodiments, the values of the fluid conductance table are updated based on response (e.g., feedback signals, pressure values measured, etc.). In some embodiments, responsive to the inlet pressure exceeding a value (e.g., 500 Torr), the calibration is ended for a valve.

Figure 3A:
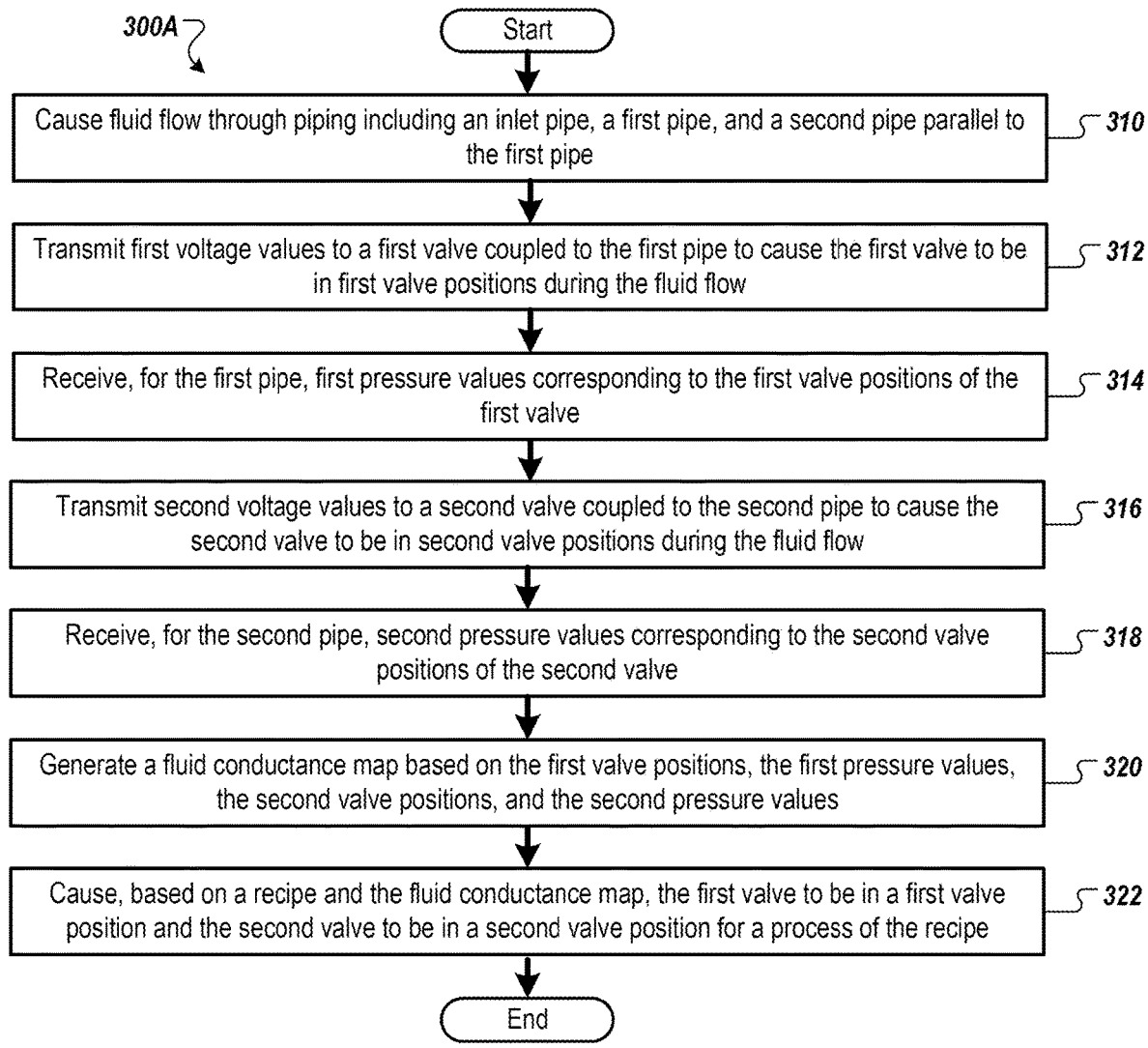
FIGS. 3A-B are flow diagrams of methods associated with using flow rate control valves in a substrate processing system, according to certain embodiments.
Figure 3B:
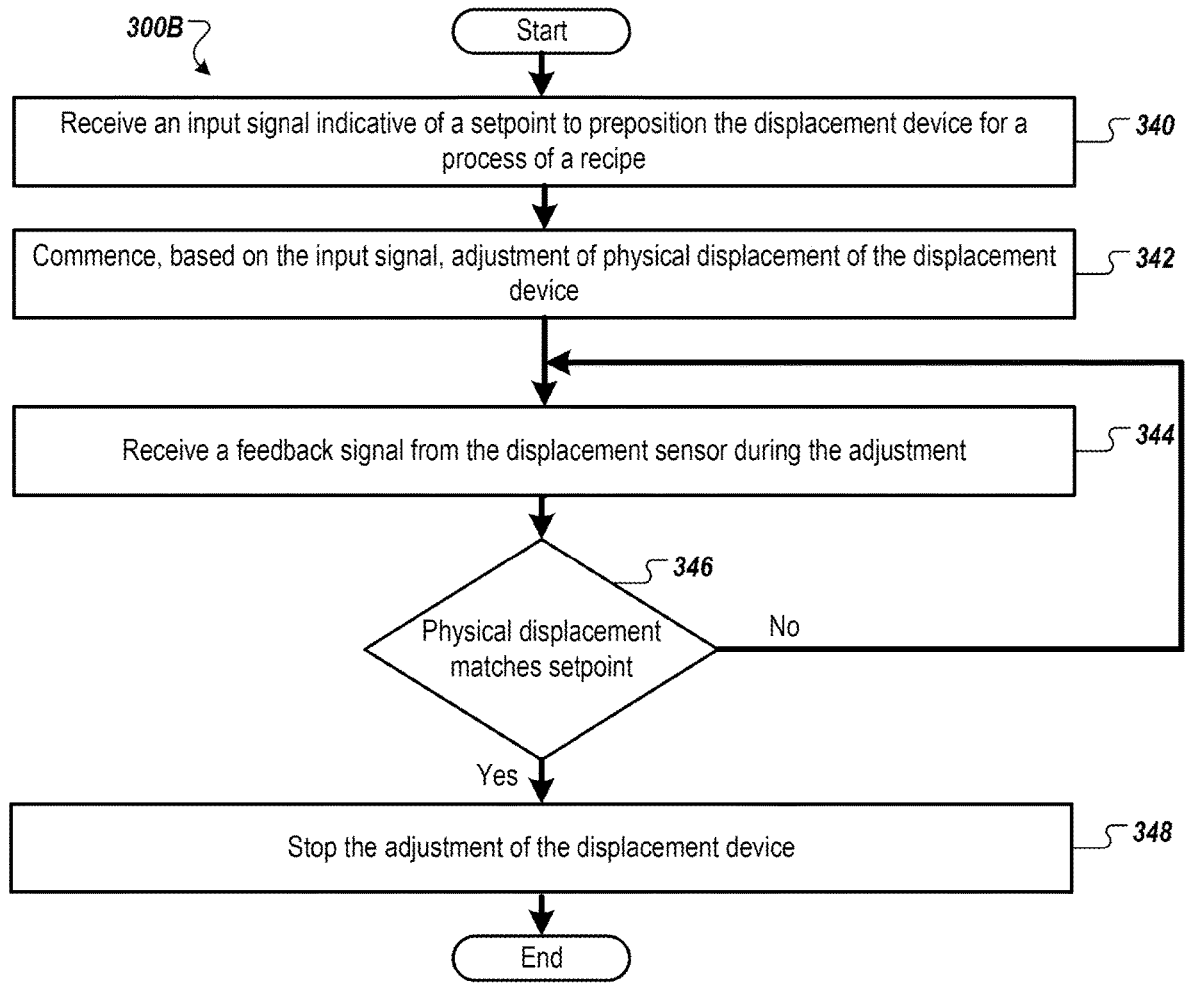

FIGS. 3A-B are flow diagrams of methods 300A-B associated with using flow rate control valves (e.g., valves 126 of FIG. 1, valves 200A-D of FIGS. 2A-D, etc.) in a substrate processing system (e.g., substrate processing system 100 of FIG. 1), according to certain embodiments. Methods 300A-B are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, method 300A is performed, in part, by controller 140 of FIG. 1. In some embodiment, method 300C is performed, in part, by valves 126 of FIG. 1 and/or processing device 230 of FIGS. 2A-D. In some embodiments, a non-transitory storage medium stores instructions that when executed by a processing device (e.g., of controller 140 of FIG. 1, of valves 126 of FIG. 1, processing device 230 of FIGS. 2A-D, etc.) cause the processing device to perform one or more of methods 300A-B.

For simplicity of explanation, methods 300A-B are depicted and described as a series of operations. However, operations in accordance with this disclosure can occur in various orders and/or concurrently and with other operations not presented and described herein. Furthermore, in some embodiments, not all illustrated operations are be performed to implement methods 300A-B in accordance with the disclosed subject matter. In addition, those skilled in the art will understand and appreciate that methods 300A-B could alternatively be represented as a series of interrelated states via a state diagram or events.

Referring to FIG. 3A, at block 310 of method 300A, processing logic causes fluid flow (e.g., of an inert gas, such as one or more of nitrogen, argon, neon, helium, krypton, or xenon) through piping including an inlet pipe and a plurality of pipes substantially in parallel, the plurality of pipes including a first pipe and a second pipe parallel to the first pipe (e.g., flow through inlet pipe branches to at least the first and second pipes). In some embodiments, the processing logic transmits a signal to a fluid manifold to cause the fluid manifold to provide fluid flow of one or more inert gases through the piping. In some embodiments, the processing logic causes different inlet flow rates of the inert gas (e.g., 500 sccm, 1000 sccm, etc.).

In some embodiments, the piping splits the fluid flow that is routed through the inlet pipe into flow through at least the first pipe and the second pipe. A first valve is used to control flow through the first pipe and a second valve is used to control flow through the second pipe. In some embodiments, the first and second pipe have similar characteristics (e.g., similar fluid conductance, similar head, similar size, similar routing, etc.). In some embodiments, the first and second pipe have different characteristics. The inlet pipe receives fluid flow from a fluid source (e.g., via a fluid manifold controlled by the processing logic). The first and second pipes provide the fluid flow (e.g., from the fluid source via the inlet pipe to the first and second pipes) to one or more locations (e.g., one or more chambers, one or more zones, one or more portions of a showerhead disposed in a processing chamber). In some embodiments, a flow splitting device includes one or more of the inlet pipe, the first pipe, the second pipe, the first valve, and/or the second valve.

At block 312, processing logic transmits first voltage values to a first valve coupled to the first pipe to cause the first valve to be in first valve positions during the fluid flow. In some embodiments, the processing logic transmits the first voltage values to a first valve during the different inlet flow rates of the inert gas (e.g., 100% open, 50% open, etc. at 500 sccm; 100% open, 50% open, etc. at 1000 sccm, etc.).

At block 314, processing logic receives, for the first pipe, first pressure values corresponding to the first valve positions of the first valve. In some embodiments, the first pressure values include a corresponding set of pressure values for each inlet flow rate. In some examples, the first pressure values include a first set of pressure values including a first pressure value for a first valve position at a first inlet flow rate, a second pressure value for a second valve position at the first inlet flow rate, etc.

In some embodiments, the first pressure values are determined while the first valve is in different valve positions and other valves in parallel (e.g., the second valve) are in closed positions.

In some embodiments, blocks 312-314 are repeated for each valve coupled to a corresponding pipe running in parallel to the first pipe (e.g., for the plurality of pipes and corresponding plurality of valves). For example, blocks 316-318 are for a second pipe.

At block 316, processing logic transmits second voltage values to a second valve coupled to the second pipe to cause the second valve to be in second valve positions during the fluid flow. Block 316 is similar to block 312, but for the second valve.

At block 318, processing logic receives, for the second pipe, second pressure values corresponding to the second valve positions of the second valve. Block 318 is similar to block 314, but for the second valve. In some embodiments, the second pressure values are determined while the second valve is in different valve positions and other valves in parallel (e.g., the first valve) are in closed positions.

In some embodiments, processing logic transmits third voltage values to a third valve coupled to a third pipe to cause the third valve to be in third valve positions during the fluid flow and receives, for the third pipe, third pressure values corresponding to the third valve positions of the third valve (e.g., that is in different valve positions and other valves are in closed positions).

At block 320, processing logic generates a fluid conductance map (e.g., fluid conductance curves, fluid conductance table, etc.) based on the valve positions and pressure values (e.g., at least the first valve positions, the first pressure values, the second valve positions, and the second pressure values). In some embodiments, the processing logic generates the fluid conductance map further based on the third valve positions and the third pressure values. In some embodiments, processing logic generates the fluid conductance map via one or more operations. The fluid conductance map indicates which voltages correspond to which flow rates through each pipe. In some embodiments, two or more of the plurality of pipes that are substantially in parallel (e.g., the first pipe and the second pipe) have different characteristics (e.g., different fluid conductance) so that the first valve is set a first voltage (e.g., 4.9 V) and a second valve is set at a second voltage (e.g., 5.2 V) to cause both pipes to have the same flow rate. In some embodiments, voltage values can be determined using the fluid conductance map based on flow rates or pressures corresponding to a process of a recipe.

At block 322, processing logic causes, based on a recipe and the fluid conductance map, two or more valves to be valve positions (e.g., the first valve to be in a first valve position and the second valve to be in a second valve position) for a process of the recipe. In some embodiments, the processing logic further causes, based on the recipe and the fluid conductance map, a third valve to be in a third valve position for the process of the recipe. In some embodiments, the processing logic determines parameters (e.g., pressure values, flow rate values, etc.) from an upcoming process in a recipe, determines corresponding voltage values from the fluid conductance map based on the parameters, and causes the valves to be in the valve positions by transmitting the corresponding voltage values to the valves.

In some embodiments, the processing logic causes the valves to be prepositioned in valve positions that are to be used during an upcoming process of a recipe. In some embodiments, the processing logic causes the valves to be opened to clear fluid out of the pipes in preparation for an upcoming process of a recipe (e.g., that will use a different fluid that what was previously used).

In some embodiments, processing logic generates a model of fluid conductance ratios.

The model of fluid conductance ratios includes inlet flow rates (e.g., sccm). The inlet flow rate is the flow rate of an inert gas (e.g., nitrogen ($N_2$)) into the inlet pipe (e.g., measured at the fluid manifold, measured at the inlet pipe, etc.) that will branch into the parallel pipes. Different inlet flow rates are used to generate the model of fluid conductance ratios. In some embodiments, the different inlet flow rates are common flow rates used in one or more recipes. In some embodiments, the range of different inlet flow rates include a range of flow rates used in one or more recipes. In some embodiments, the different flow rates are incrementally spaced (e.g., 500, 1000, 1500, 2000, etc. sccm).

The model of fluid conductance ratios includes ratio setpoints. In some embodiments, the ratio setpoints include different voltage values (e.g., 0-10 V or 0-5 V where 0 is closed and the highest voltage is completely open). In some embodiments, the ratio setpoints include different percentages of being open (e.g., 0% to 100% open). In some embodiments, the ratio setpoints include a ratio of a parameter (e.g., percent open, voltage, flow rate, pressure) of one valve to another. For example, a ratio setpoint of 1 is 1:1, a ratio setpoint of 2 is 2:1, etc.

The model of fluid conductance ratios includes corresponding values (e.g., V1x, V2x) for the inlet flow rates and the ratio setpoints. In some embodiments, the corresponding values (e.g., V1x, V2x) are pressure values of the pipes for the different inlet flow rates and the different ratio setpoints. For example, for a first inlet flow rate (e.g., 500 sccm) and a first ratio setpoint (e.g., first valve and second valve are completely open), a first pressure value (e.g., V1x1) of a first pipe coupled to the first valve and a second pressure value (e.g., V2x1) of a second pipe coupled to the second valve are determined. In some embodiments, the corresponding values (e.g., V1x, V2x) are voltage values of the valves for the different inlet flow rates and the different ratio setpoints. For example, for a first inlet flow rate (e.g., 500 sccm) and a first ratio setpoint (e.g., first valve and second valve are completely open), a first voltage value (e.g., V1x1) of a first pipe coupled to the first valve and a second voltage value (e.g., V2x1) of a second pipe coupled to the second valve are determined.

In some embodiments, the pressure values of the model of fluid conductance ratios are determined by blocks 310-318 of method 300A of FIG. 3A.

In some embodiments, processing logic generates a fluid conductance map (e.g., fluid conductance table, fluid conductance curves, graph, a learned fluid conductance map, etc.) based on the model of fluid conductance ratios.

The fluid conductance map includes valve setpoints (e.g., Volts (V), input/output first and second valve voltage setpoints) for the different valves and the corresponding pressure values (e.g., Torr) at the valve setpoints for the different valves. In some embodiments, the pressure values and/or voltage values are from the model of fluid conductance ratios.

In some embodiments, a control loop includes using inlet flow rate setpoints and ratio setpoints to determine different pressure values (e.g., blocks 310-318 of FIG. 3A) to enter into the model of fluid conductance ratios. The different pressure values from the model of fluid conductance ratios are entered into the fluid conductance map in connection with the corresponding voltage setpoints used for the ratio setpoints of the model of fluid conductance ratios.

In some embodiments, a valve setpoint (e.g., voltage value) is interpolated (e.g., estimated) from the fluid conductance map based on a pressure value that is not on the fluid conductance map. In some embodiments, a valve setpoint (e.g., voltage value) for a first inlet flow rate (e.g., flow rate from fluid manifold or inlet pipe) is interpolated (e.g., estimated) from fluid conductance maps (e.g., fluid conductance curves) corresponding to different inlet flow rates (e.g., a second inlet flow rate less than the first inlet flow rate and a third inlet flow rate greater than the first inlet flow rate).

In some embodiments blocks 310-320 of FIG. 3A are repeated to one or more of update the model of conductance ratios, update the fluid conductance map, determine whether there is drift (e.g., sensor value drift, ratio drift, conductance drift, valve displacement device drift, etc.), determine root cause of variability, determine whether a corrective action is to be performed, determine whether response times of the valves are lagging, and/or the like. A corrective action includes one or more of providing an alert, updating a manufacturing parameter, performing preventative maintenance, replacing a component, interrupting manufacturing equipment (e.g., processing chamber), and/or the like.

Referring to FIG. 3B, at block 340 of method 300B, processing logic receives an input signal indicative of a setpoint to preposition the displacement device for a process of a recipe. In some embodiments, the processing logic receives one or more input signals indicative of one or more setpoints to preposition one or more displacement devices (e.g., of a FRC valve, of multiple FRC valves) for a process of a recipe. In some embodiments, the input signal is a voltage value corresponding to a pressure value (or flow rate value) to be used in the process of the recipe. In some embodiments, the input signal is received from a controller of a substrate processing system. In some embodiments, the input signal (e.g., voltage value) corresponds to the pressure value on a fluid conductance map.

At block 342, processing logic commences, based on the input signal, adjustment of physical displacement of the displacement device (e.g., one or more displacement devices). In some embodiments, the adjustment of the physical displacement of the displacement device is by applying voltage to the displacement device. In some embodiments, the displacement device is a piezoelectric material that increases or decreases the opening through the valve by moving a diaphragm that is disposed between the piezoelectric material and the wetted flow path in the valve. In some embodiments, the displacement device is a solenoid that increases or decreases the opening through the valve by moving a diaphragm that is disposed between the solenoid and the wetted flow path in the valve.

At block 344, processing logic receives a feedback signal from the displacement sensor during the adjustment. The displacement sensor is electrically coupled to the displacement device. In some embodiments, the displacement sensor is one or more of a strain gauge, a capacitance sensor, or an eddy current sensor. As the physical displacement of the displacement device is adjusted by applying voltage to the displacement device, the displacement sensor determines the physical displacement of the displacement device.

At block 346, processing logic determines, based on the feedback signal, whether the physical displacement matches the setpoint. For example, if the setpoint indicates the physical displacement is to be 1 micron, the processing logic determines whether the feedback signal indicates 1 micron of physical displacement. Responsive to the physical displacement not matching the setpoint, flow returns to block 344. Responsive to the physical displacement matching the setpoint, flow continues to block 348.

At block 348, processing logic stops the adjustment of the displacement device. In some embodiments, the setpoint is a voltage value (e.g., 5V) that corresponds to a physical displacement (e.g., completely open the valve). In some embodiments, by using the feedback signal, an updated voltage value (e.g., 4.9 V, 5.2 V) is used to achieve the physical displacement. Although method 300B is described for a displacement device, in some embodiments, method 300B is applied to two or more displacement devices (e.g., of a single FRC valve, of two or more FRC valves, etc.).

Figure 4:
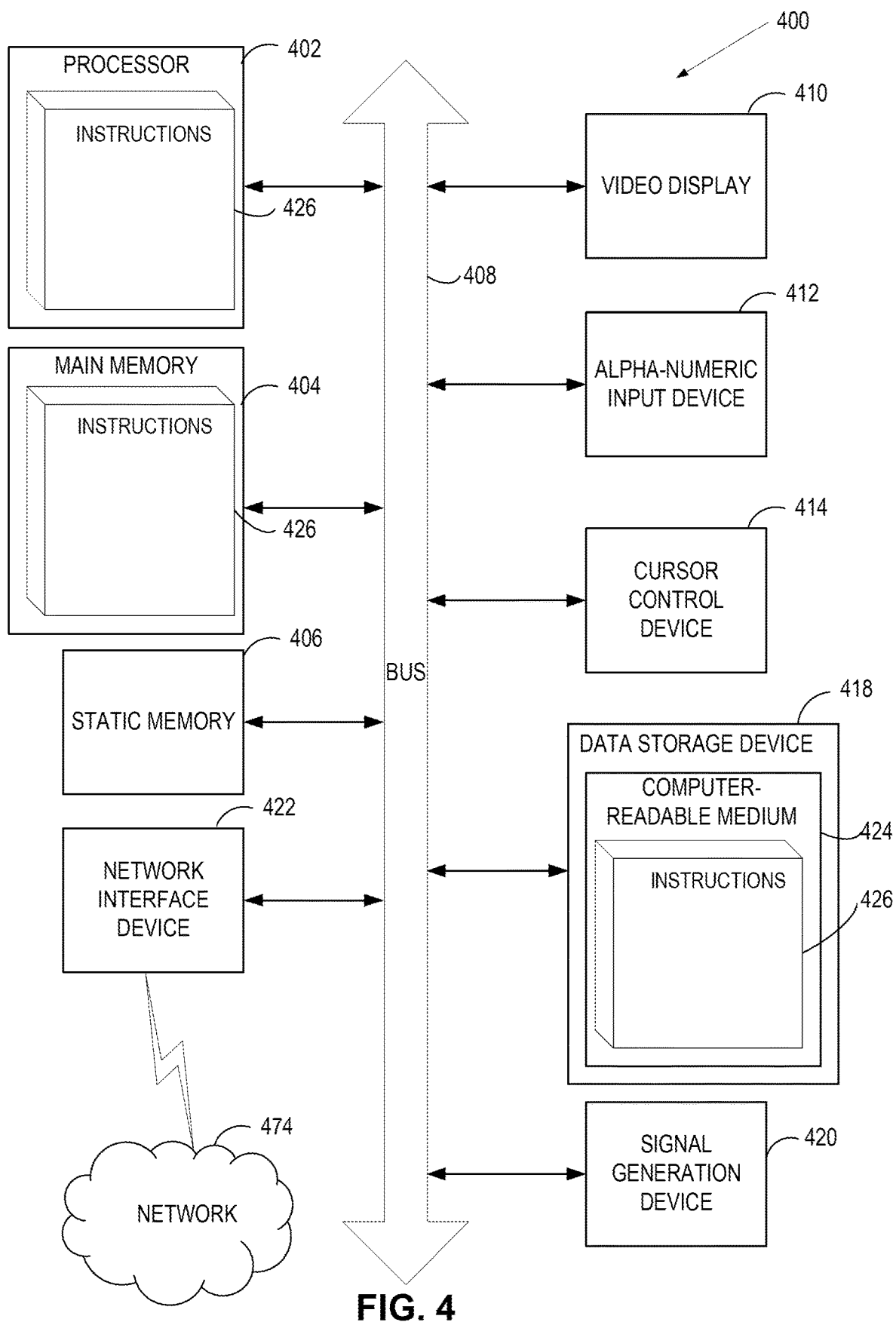
FIG. 4 is a block diagram illustrating a computer system, according to certain embodiments.

FIG. 4 is a block diagram illustrating a computer system 400, according to certain embodiments. In some embodiments, computer system 400 is controller 140 of FIG. 1. In some embodiments, computer system is valve 126 of FIG. 1, valve 200 of FIGS. 2A-D, and/or processing device 230 of FIG. 2. In some embodiments, computer system 400 includes one or more of the components shown in FIG. 4 (e.g., computer system 400 does not include each of the components shown in FIG. 4).

In some embodiments, computer system 400 is connected (e.g., via a network, such as a Local Area Network (LAN), an intranet, an extranet, or the Internet) to other computer systems. Computer system 400 operates in the capacity of a server or a client computer in a client-server environment, or as a peer computer in a peer-to-peer or distributed network environment. In some embodiments, computer system 400 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 400 includes a processing device 402, a volatile memory 404 (e.g., Random Access Memory (RAM)), a non-volatile memory 406 (e.g., Read-Only Memory (ROM) or Electrically-Erasable Programmable ROM (EEPROM)), and/or a data storage device 416, which communicates with each other via a bus 408.

In some embodiments, processing device 402 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 400 further includes a network interface device 422 (e.g., coupled to network 474). In some embodiments, computer system 400 also includes a video display unit 410 (e.g., an LCD), an alphanumeric input device 412 (e.g., a keyboard), a cursor control device 414 (e.g., a mouse), and/or a signal generation device 420.

In some implementations, data storage device 416 includes a non-transitory computer-readable storage medium 424 on which stores instructions 426 encoding any one or more of the methods or functions described herein, including instructions for implementing methods described herein.

In some embodiments, instructions 426 also reside, completely or partially, within volatile memory 404 and/or within processing device 402 during execution thereof by computer system 400, hence, volatile memory 404 and processing device 402 also constitute machine-readable storage media, in some embodiments.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. Further, the methods, components, and features are implemented in any combination of hardware devices and computer program components, or in computer programs.

Unless specifically stated otherwise, terms such as "receiving," "generating," "causing," "determining," "transmitting," "commencing," "stopping," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or it includes a general purpose computer system selectively programmed by a computer program stored in the computer system. Such a computer program is stored in a computer-readable tangible storage medium.

The methods and illustrative examples described herein are not inherently related to any particular computer or other apparatus. Various general purpose systems are used in accordance with the teachings described herein, or, in some embodiments, it proves convenient to construct more specialized apparatus to perform methods described herein and/or each of their individual functions, routines, subroutines, or operations. Examples of the structure for a variety of these systems are set forth in the description above.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." In some embodiments, when the term "about" or "approximately" is used herein, this is intended to mean that the nominal value presented is precise within ±10%.

The terms "over," "under," "between," "disposed on," and "on" as used herein refer to a relative position of one material layer or component with respect to other layers or components. In some examples, one layer disposed on, over, or under another layer is directly in contact with the other layer or has one or more intervening layers. In some examples, one layer disposed between two layers is directly in contact with the two layers or has one or more intervening layers. Similarly, in some examples, one feature disposed between two features is in direct contact with the adjacent features or has one or more intervening layers.

Various embodiments can have different combinations of the structural features described above. For instance, all optional features of an enclosure described above can also be implemented in an enclosure and specifics in the examples can be used anywhere in one or more embodiments.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A flow ratio controller (FRC) valve comprising:
   a displacement device configured to control fluid flow through the FRC valve;
   a displacement sensor coupled to the displacement device; and
   a processing device to:
   identify an input signal indicative of a first setpoint to preposition the displacement device for a process of a recipe, wherein the process of the recipe comprises flowing a fluid through the FRC valve associated with substrate processing;
   commence, based on the input signal, adjustment of physical displacement of the displacement device to be in a plurality of configurations to adjust a fluid flow pathway through the FRC valve;
   determine, based on a feedback signal received from the displacement sensor during the adjustment, that a corresponding physical displacement of the displacement device in a corresponding configuration matches the first setpoint; and
   responsive to determining that the corresponding physical displacement of the displacement device in the corresponding configuration matches the first setpoint, stop the adjustment of the physical displacement of the displacement device, wherein the process of the recipe is to be started subsequent to stopping the adjustment of the physical displacement of the displacement device.

2. The FRC valve of claim 1, wherein the displacement device, the displacement sensor, and the processing device are outside of a wetted flow path of the FRC valve.

3. The FRC valve of claim 1, wherein a diaphragm separates the displacement device, the displacement sensor, and the processing device from a wetted flow path of the FRC valve.

4. The FRC valve of claim 1, wherein the displacement device is a piezoelectric material or a solenoid.

5. The FRC valve of claim 1, wherein the displacement sensor is a strain gauge, a capacitance sensor, or an eddy current sensor.

6. The FRC valve of claim 1, wherein the input signal is a first voltage to cause the physical displacement of the displacement device, and wherein a second input signal is a second voltage to cause a second physical displacement of the displacement device.

7. The FRC valve of claim 1, wherein a third input signal is a third voltage to cause a third physical displacement of a second displacement device configured to control the fluid flow through the FRC valve.

8. A method comprising:
   identify, by a processing device of a flow ratio controller (FRC) valve, an input signal indicative of a first setpoint to preposition a displacement device of the FRC valve for a process of a recipe, wherein the process of the recipe comprises flowing a fluid through the FRC valve associated with substrate processing, the displacement device being configured to control fluid flow through the FRC valve;
   commencing, based on the input signal, adjustment of physical displacement of the displacement device to be in a plurality of configurations to adjust a fluid flow pathway through the FRC valve;
   determining, based on a feedback signal received from a displacement sensor of the FRC valve during the adjustment, that a corresponding physical displacement of the displacement device in a corresponding configuration matches the first setpoint, the displacement sensor being coupled to the displacement device; and
   responsive to the determining that the corresponding physical displacement of the displacement device in the corresponding configuration matches the first setpoint, stopping the adjustment of the physical displacement of the displacement device, wherein the process of the recipe is to be started subsequent to stopping the adjustment of the physical displacement of the displacement device.

9. The method of claim 8, wherein the displacement device, the displacement sensor, and the processing device are outside of a wetted flow path of the FRC valve.

10. The method of claim 8, wherein a diaphragm separates the displacement device, the displacement sensor, and the processing device from a wetted flow path of the FRC valve.

11. The method of claim 8, wherein the displacement device is a piezoelectric material or a solenoid.

12. The method of claim 8, wherein the displacement sensor is a strain gauge, a capacitance sensor, or an eddy current sensor.

13. The method of claim 8, wherein the input signal is a first voltage to cause the physical displacement of the displacement device, and wherein a second input signal is a second voltage to cause a second physical displacement of the displacement device.

14. The method of claim 8, wherein a third input signal is a third voltage to cause a third physical displacement of a second displacement device configured to control the fluid flow through the FRC valve.

15. A non-transitory computer readable medium having instructions stored thereon, which, when executed by a processing device of a flow ratio controller (FRC) valve, cause the processing device to:
   identify an input signal indicative of a first setpoint to preposition a displacement device of the FRC valve for a process of a recipe, wherein the process of the recipe comprises flowing a fluid through the FRC valve associated with substrate processing, the displacement device being configured to control fluid flow through the FRC valve;
   commence, based on the input signal, adjustment of physical displacement of the displacement device to be in a plurality of configurations to adjust a fluid flow pathway through the FRC valve;
   determine, based on a feedback signal received from a displacement sensor of the FRC valve during the adjustment, that a corresponding physical displacement of the displacement device in a corresponding configuration matches the first setpoint, the displacement sensor being coupled to the displacement device; and
   responsive to determining that the corresponding physical displacement of the displacement device in the corresponding configuration matches the first setpoint, stop the adjustment of the physical displacement of the displacement device, wherein the process of the recipe is to be started subsequent to stopping the adjustment of the physical displacement of the displacement device.

16. The non-transitory computer readable medium of claim 15, wherein the displacement device, the displacement sensor, and the processing device are outside of a wetted flow path of the FRC valve.

17. The non-transitory computer readable medium of claim 15, wherein a diaphragm separates the displacement device, the displacement sensor, and the processing device from a wetted flow path of the FRC valve.

18. The non-transitory computer readable medium of claim 15, wherein the displacement device is a piezoelectric material or a solenoid.

19. The non-transitory computer readable medium of claim 15, wherein the displacement sensor is a strain gauge, a capacitance sensor, or an eddy current sensor.

20. The non-transitory computer readable medium of claim 15, wherein the input signal is a first voltage to cause the physical displacement of the displacement device, and wherein a second input signal is a second voltage to cause a second physical displacement of the displacement device.

* * * * *